Inventors:
George W. Dunham,
Thomas T. Woodson,
Herbert F. Bariffi,
by Harry E. Dunham
Their Attorney.

Patented May 25, 1943

2,320,176

UNITED STATES PATENT OFFICE 2,320,176

REVERSIBLE SINGLE PHASE MOTOR

George W. Dunham, Westport, Thomas T. Woodson, Fairfield, and Herbert F. Bariffi, Hamden, Conn., assignors to General Electric Company, a corporation of New York Application August 6, 1942, Serial No. 453,808

2 Claims. (Cl. 172—279)

Our invention relates to a reversible single phase motor control of the type in which the motor is provided with a split phase starting winding which is cut out of circuit when the motor comes up to running speed. Our invention has for its object simple means for assuring that the motor will reverse following a reversal of the reversing winding under all conditions. Either motor winding may be used for the reversing winding.

The features of our invention which are believed to be novel and patentable will be pointed out in the claims appended hereto. For a better understanding of our invention reference is made in the following description to the accompanying drawing showing in Fig. 1 an embodiment of our invention in which the starting winding is reversed to reverse the motor and in Fig. 2 a modification where the main or running winding constitutes the reversing winding.

Figure 1:
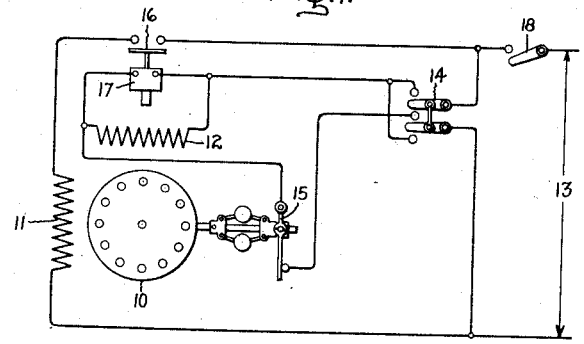

Referring to Fig. 1, 10 represents the rotor secondary of a squirrel cage induction motor which has a main running winding 11 and a starting winding 12. The motor is energized from a source of supply 13. 14 represents a reversing switch in the starting winding circuit and 15 a speed responsive switch in said circuit, the latter switch being closed as represented when the motor is not running or is running at low speeds. 16 represents a switch in the main winding circuit which is normally biased to an open position but which is closed by a relay 17 when the latter is energized. Such relay is connected across the starting winding. The reversing switch 14 may be used to start the motor as well as for reversing and we may add another control switch in either side of the line, as for example the switch 18 for stopping and starting purposes.

The relay 17 is energized under two different conditions, namely, first, from the voltage of line 13 when the motor is at standstill or operating at low speed with the starting winding energized through switch 15, and second, by transformer action from winding 11 through the motor rotor when winding 11 is energized and the motor is running single phase at and near normal speed, with the speed responsive switch 15 open.

The operation is as follows: Assuming reversing switch 14 to be closed to select the direction of rotation and switches 16 and 18 open as represented with the motor at standstill, the motor is started by closing switch 18. This energizes the starting winding 12 and relay coil 17 through switch 15. Switch 16 immediately closes and the motor starts. At a suitable speed the centrifugal switch 15 opens. By this time, however, a voltage exists across winding 12 by reason of transformer action from winding 11 acting through the revolving field which exists in the rotor at this time, which voltage is ample to hold switch 16 closed and the motor thus runs single phase. A voltage failure or the opening of switch 18 will now cause relay 17 to drop out and it cannot be energized again until the speed drops sufficiently to close switch 15. The reversing of switch 14 has no effect when the motor is running single phase because the circuit of winding 12 is open at switch 15. The reversing switch may, however, be operated at leisure when the motor is running single phase to select the direction of rotation when the motor is next started.

Assume, now, the motor to be running single phase and that it is desirable to reverse the direction of rotation. Switch 14 is reversed to select the new direction of rotation and switch 18 opened and closed again immediately. At the instant winding 11 is deenergized by the momentary opening of switch 18, relay 17 drops out and when switch 18 is reclosed, the motor remains completely deenergized until the speed drops low enough to reclose the speed responsive switch 15. When this happens switch 16 also closes and both motor windings are again energized and the motor quickly stops with a powerful reversing torque and reverses, comes up to speed in the opposite direction, switch 15 opens and normal single phase operation on winding 11 follows. It is thus seen that the operation of the motor and its direction of rotation is completely under control at all times and that it is necessary to reduce speed to a point where switch 15 is closed and the future direction of rotation definitely determined each time the motor is deenergized, regardless of how quickly the switch 18 is reclosed. That is, it is unnecessary to wait until the motor slows down to set the switches for a reversing operation.

If switch 16 were omitted, a quick-opening and closing of switch 18 would reenergize winding 11 before the speed reduced to a point where the switch 15 snapped to starting position and the motor would then resume single phase operation in the same direction, and the fact that switch 14 was also reversed would have no effect.

Figure 2:
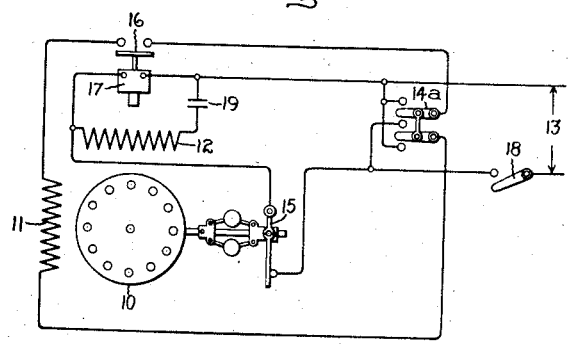

Instead of reversing the starting winding, the main winding may be reversed as shown in Fig. 2 where the reversing switch 14a is connected in the main winding circuit. The operation is the same as in Fig. 1 except that in reversing in Fig. 2 it is unnecessary to open switch 18, because the opening of switch 14a to throw it to the reversed position also momentarily deenergized the main winding 11 and allows switch 16 to open. The switch 18 should be opened for permanent shutdowns to avoid flow of current in the starting winding.

The motor of Fig. 1 is assumed to be of the permanent resistance, split-phase type. However, the invention is equally applicable to motors which have phase splitting devices separate from the motor windings and in Fig. 2 we have shown a phase-splitting condenser 19 in the starting winding circuit for that purpose. The main and starting windings are displaced at a suitable angle to each other and their winding circuits have different time constants to obtain split-phase starting torque as in the usual single phase split-phase motor.

What we claim as new and desire to secure by Letters Patent of the United States is:

1. A single phase alternating current motor comprising a rotor, a stator having main and starting windings displaced at an angle to each other, circuits for energizing said windings in parallel from an alternating current source, said winding circuits having different time constants whereby the currents in said windings are displaced in phase to obtain split-phase starting, a switch which is responsive to the speed of the motor for opening the starting winding circuit as the motor speeds up between starting and running conditions, a switch in the main winding circuit biased to an open position, means responsive to the voltage across the starting winding for closing said last mentioned switch when the starting winding is energized upon starting the motor and for holding such switch closed during single phase motor operation on the main winding after the speed responsive switch has opened, and means for reversing one of said windings relative to the other to determine the direction of rotation of the motor.

2. A single phase alternating current motor having a rotor, a stator with main and starting windings displaced at an angle to each other, a switch which is responsive to the speed of the motor for opening the starting winding circuit as the motor comes up to speed, a switch in the main winding circuit biased to an open position, a relay responsive to the voltage across the starting winding for closing the last mentioned switch means for reversing one of said windings with respect to the other and a line switch for energizing and deenergizing the motor.

GEORGE W. DUNHAM.
THOMAS T. WOODSON.
HERBERT F. BARIFFI.